3,130,190
WATER INSOLUBLE MONOAZO DYESTUFFS
Ernest Merian, Bottmingen, and Otto Senn, Arlesheim, Switzerland, assignors to Sandoz Ltd., Basel, Switzerland
No Drawing. Filed Nov. 28, 1961, Ser. No. 167,991
Claims priority, application Switzerland Nov. 29, 1960
6 Claims. (Cl. 260—163)

Water-insoluble compounds which are obtained by coupling diazotized amines with 5-pyrazolone-3-carboxylic acid esters or 5-pyrazolone-3-carboxylic acid amides are known. They have been used hitherto as intermediates in the synthesis of dyes. For this purpose they are prepared in the form of their quaternary ammonium compounds in order to render them soluble in water. The quaternary ammonium compounds are recommended for the dyeing of polyacrylonitrile.

It has now been found that polyacrylonitrile and other hydrophobic plastics in the molded state, e.g. as filaments, fibers or textiles made therefrom, can be dyed better with the water-insoluble monoazo dyes of the general formula

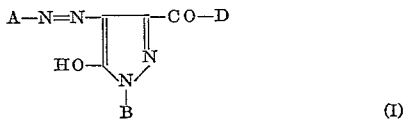

In this formula

A represents a benzene radical which may be substituted in ortho position to the azo group by halogen, alkoxy or nitrile and may contain any other desired non water solubilizing substituents in the other positions,
B is a hydrogen atom or a hydrocarbon radical, which latter may be substituted and
D is NYY′ where Y and Y′ are hydrogen atoms or hydrocarbon radicals, which latter may be substituted, or Y and Y′ are both members of a ring which may contain further hetero atoms.

More precisely the most valuable new dyes have the formula

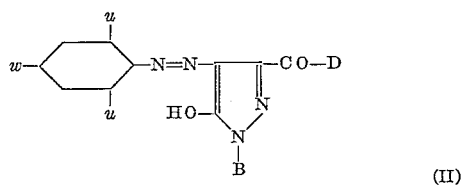

in which each of the symbols $u$ represents a member selected from the class consisting of hydrogen, chlorine, bromine, low molecular alkoxy and nitrile,
$w$ represents a member selected from the class consisting of hydrogen and negative substituents,
B is a member selected from the class consisting of a hydrogen atom and a low molecular alkyl and a phenyl radical and
D is an amino group.

Suitable negative substituents are halogen atoms, preferably chlorine or bromine, the nitro group, a low molecular carbalkoxy group, a sulfonamide group which may be substituted, preferably by low molecular alkyl groups, the nitrile group, a sulfonyl group or a carboxylic acid amide group which may be substituted for example by low molecular alkyl groups.

The production of the dyes of formula I is carried out in the normal manner. It is of special advantage to couple the diazotized amine with the pyrazolone derivative in the pH-region of 3 to 9. The dyes thus formed can be employed as disperse dyes, chiefly for the dyeing, padding and printing of fibers of filaments of linear aromatic polyesters and of all classes of textiles made from such fibers of filaments. For this purpose a dye of Formula I or a mixture of dyes of this formula is converted into a dyeing preparation in the normal way by grinding it finely with the auxiliary agents commonly used in preparations of disperse dyes. Examples of such auxiliary agents are dispersing agents, particularly those of anionic character, wetting or emulsifying agents, and neutral inorganic salts. The resulting dyeing preparations are finely dispersed in water.

It is preferable to prepare the dyebath with 0.1–8% dye on the weight of the goods. The goods to liquor ratio may vary from 1:5 to 1:60. Padding liquors contain about 1–200 grams, or more particularly 20–60 grams, dye per liter. Printing pastes, which are prepared in the normal way with thickening agents, usually contain approximately equal amounts of dye per kilogram paste as the dyebaths per liter bath volume. Suitable thickening agents are e.g. alginate, gum tragacanth, crystal gum, and locust bean gum. Highly suitable dispersing, wetting and emulsifying agents are the alkaline salts of condensation products of arylsulfonic acids and formaldehyde, e.g. sodium dinaphthylmethane disulfonate, alkylarylsulfonates, fatty alcohol sulfonates and fatty alcohol sulfates. Dyeing and printing are carried out under the conditions normal in practice. There is an extensive literature on dyeing and printing with disperse dyes.

The dyeing temperatures may vary from 80° to 140° C., or more particularly from 90° to 130° C. It is often advantageous to use a carrier; suitable carriers are e.g. phenols such as phenol itself or ortho-phenyl phenol, hydroxycarboxylic acid esters, e.g. salicylic acid ester, and chlorinated hydrocarbons, e.g. chlorinated benzenes.

When the dye has been applied to the fiber it is generally fixed. This effected, if desired after intermediate drying, by heating in presence of water vapor, usually at about 100–120° C., or in a dry atmosphere, in which case the temperature is often higher, e.g. about 180–220° C. After fixation, the goods are rinsed, soaped if necessary, rinsed again and dried.

The sparingly water-soluble azo dyes can be applied from aqueous dispersion and give yellow or orange shades on filaments and fibers of polyamides (e.g. nylon, "Perlon" registered trademark), i.e. those of poly-caprolactam or poly-condensates of dicarboxylic acids and diamines, e.g. adipic or sebacic acid and hexamethylene diamine, or of aminocarboxylic acids, e.g.—aminoundecanoic acid, and also secondary cellulose acetate and triacetate, vinyl copolymers, polyethylene, polypropylene, acrylic and modified acrylic fibers consisting of more than 80% of acrylonitrile and about 1–20% of another monomer, and especially linear aromatic polyesters, e.g. polyterephthalic acid glycol esters and polyterephthalic acid ethylene glycol esters, e.g. Terylene, Dacron, Dacron 64, Tergal, Trevira, Diolen, Terital, Teron, Fortrel, Vycron, Kodel (registered trademarks). The dyeings and prints have very good fastness to light, gas fumes, washing, perspiration, water, sea water, pleating, sublimation, and heat setting, and are dischargeable. They largely reserve viscose, cotton and wool, the reserve being particularly good when after-treated with hydrosulfite. The dyes are valuable as main elements in dye combinations for green, brown and grey shades fast to light and pleating.

Some of the dyes give valuable combination dyeings with the blue component of the formula

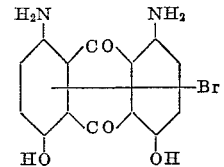

A number of the new dyes are suitable for the coloration of lacquers, oils, synthetic resins and man-made (artificial) fibers in the mass.

The spun-dyed shades obtained with them in cellulose acetate and triacetate have good fastness to light, washing, perspiration, gas fumes, cross dyeing, alkaline bleaching, oxalic acid, dry cleaning and peroxide bleaching. The fastness to sea water, soaping, rubbing, decatizing and pressing is excellent.

In the following examples the parts and percentages are by weight and the temperatures in degree centigrade.

EXAMPLE 1

Polyester fibers are dyed with a dye which can be produced as follows:

13.8 parts of 4-nitro-1-aminobenzene are diazotized with 25 parts of 30% hydrochloric acid and 6.9 parts of sodium nitrite. The resulting solution is clarified by filtration if necessary. It is then run at 0° with thorough stirring into a solution of 20.3 parts of 1-phenyl-5-pyrazolone-3-carboxylic acid amide in 200 parts of water and 10 parts of 30% sodium hydroxide solution with simultaneous addition of 20 parts of 25% ammonia. The precipitated dye is filtered and washed until neutral. Its melting point is 274–275°. It is applied to polyester fibers from a fine aqueous dispersion by the method which follows, giving reddish yellow shades of excellent fastness:

7 parts of the said dye, 4 parts of sodium dinaphthylmethane disulfonate, 4 parts of sodium acetylsulfate and 5 parts of anhydrous sodium sulfate are ground in a ball mill for 48 hours to give a fine powder. 0.3 part of this dyeing preparation is pasted with a little water and the dispersion added through a sieve to a dyebath containing 0.5 gram laurylalcohol sulfonate per liter. The liquor ratio in this case is 1:40 but it may vary within wide limits. 100 parts of pre-scoured Dacron polyester fiber are entered into the bath of 40–50°. The bath is slowly heated, and after the addition of 5 cc. per liter of an emulsion of a chlorinated benzene in water, dyeing is continued for 1 to 2 hours at 95–100°.

An alternative dyeing method is as follows:

10 parts of the dye, 10 parts of sulfite cellulose waste powder and 80 parts of water are ground in a ball mill for 48 hours. The resulting paste is dried in a spray drier. A dyebath is prepared with 1000 parts of water at 40–50° and 1 part of this dyeing preparation. 100 parts of pre-scoured Terylene (registered trademark) polyester fiber are entered, the bath slowly heated to 120–130° and dyeing continued for 30 minutes at this temperature under static pressure. The dye material is then rinsed, soaped, rinsed and dried. The yellow dyeing obtained is fast to light, cross dyeing, washing, water, sea water, perspiration, gas fumes, heat setting, and pleating.

The dyes obtained by reacting the components listed in the following table can be dyed in the same way.

Table

| No. | Diazo Compound of | D | B | Melting Point in °C. | Shade on Polyester Fiber |
|---|---|---|---|---|---|
| 2 | 4-aminobenzoic acid ethyl ester. | —NH$_2$ | phenyl | 203–204 | yellow. |
| 3 | 1-amino-2-chloro-4-nitro-benzene. | NH$_2$ | do | 272–274 | reddish yellow. |
| 4 | 1-amino-2,6-dichloro-4-nitro-benzene. | NH$_2$ | do | 282 | Do. |
| 5 | 1-amino-4-nitro-benzene | NH—C$_4$H$_9$ | do | 190–191 | Do. |
| 6 | ___do___ | NH—C$_2$H$_4$OH | do | 234–235 | Do. |
| 7 | 1-amino-2-chloro-4-nitro-benzene. | NH—CH$_3$ | do | 252–253 | Do. |
| 8 | 1-amino-2-chloro-benzene-4-sulfonic acid -methyl-amide. | NH$_2$ | do | 260 | Do. |
| 9 | 1-amino-2-cyan-4-nitrobenzene. | NH$_2$ | do | 288 | orange. |
| 10 | 1-amino-2-chloro-4-nitrobenzene. | —NH | do | 170 | reddish yellow |
| 11 | 1-amino-2-chloro-benzene-4-sulfonic acid dimethyl amide. | NH$_2$ | do | 174 | Do. |
| 12 | 1-amino-4-nitro-benzene | NH$_2$ | H | 288–9 | greenish yellow. |
| 13 | 1-amino-2-chloro-4-nitrobenzene. | NH$_2$ | H | above 300 | yellow. |
| 14 | 1-amino-2-chloro-4-nitrobenzene. | NH$_2$ | CH$_3$ | 192–3 | reddish yellow. |
| 15 | 1-amino-4-nitro-benzene | NHCH$_3$ | H | 288 | Do. |
| 16 | 1-amino-2-chloro-4-nitrobenzene. | NHCH$_3$ | H | 297 | yellow. |
| 17 | 1-amino-4-nitro-benzene | —NH | H | 285 | greenish yellow |
| 18 | 1-amino-2-chloro-4-nitrobenzene. | —NH | H | 205 | yellow. |
| 19 | 1-amino-2-chloro-4-nitrobenzene. | —NH | phenyl | 189–190 | reddish yellow. |
| 20 | 1-amino-4-nitro-benzene | —NH | do | 188–189 | Do. |

EXAMPLE 21

10 parts of the dye No. 10 in the form of the undried filter press cake and 10 parts of Turkey red oil are mixed with sufficient water to give a total of 200 parts. After 2 hours 4 parts of the paste formed are mixed with 5 parts of 2-hydroxy-1,1'-diphenyl and 2000 parts of water. In this dyebath at 40-50°, 100 parts of Tergal (registered trademark) polyester fiber material are entered and dyed for 1 hour at the boil, with subsequent rinsing and drying. A reddish yellow dyeing with excellent fastness properties is obtained. Penetration of the fiber by the dye is very good.

EXAMPLE 22

10 parts of the dye obtained from diazotized 1-amino-4-nitrobenzene and 1-phenyl-5-pyrazolone-3-carboxylic acid amide, 38 parts of sodium dinaphthylmethane disulfonate and 530 parts of water are ground in a ball mill for 48 hours. The colloidal solution obtained is mixed with 25 parts of butyl carbitol (dioxethylated n-butanol) and 400 parts of 6% carboxymethyl cellulose.

This printing paste is very suitable for the vigoureux or melange printing of polyester slubbing, e.g. Diolen (registered trademark). It is applied from two rollers giving a coverage of 78% and the slubbing is then steamed at 115–120° without intermediate drying. Yellow prints with good fastness properties are obtained.

EXAMPLE 23

A fine aqueous dispersion of 15 parts of the dye No. 2, 35 parts of sodium dinaphthylmethane disulfonate and 2 parts of alginate is mixed with 1000 parts of water. With this padding liquor a polyester fabric is padded in the normal way at 20–70°, air dried at 60–100°, exposed to dry air at 180–220° for 30–90 seconds, and finally rinsed, soaped and dried. Level yellow dyeings with good fastness properties are obtained.

Having thus disclosed the invention what we claim is:

1. Dyestuff of the formula

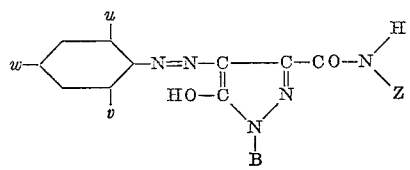

wherein

B is a member selected from the group consisting of hydrogen, phenyl and methyl,
$u$ is a member selected from the group consisting of hydrogen, chlorine, and nitrile,
$v$ is a member selected from the group consisting of hydrogen and chlorine,
$w$ is a member selected from the group consisting of nitro, lower carbalkoxy, N-mono-lower alkyl sulfonamido and N-di-lower alkylsulfonamido, and
Z is a member selected from the group consisting of hydrogen, lower alkyl and lower hydroxyalkyl, "alkyl" throughout having 1 to 4 carbon atoms.

2. Dyestuff of the formula

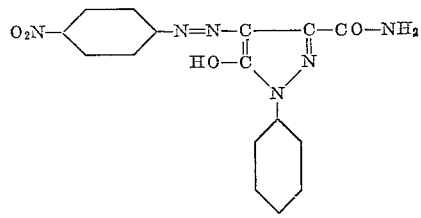

3. Dyestuff of the formula

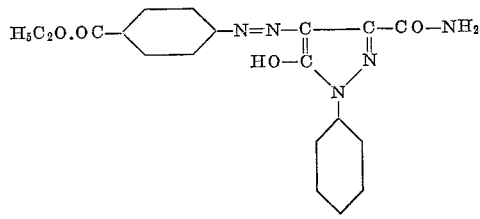

4. Dyestuff of the formula

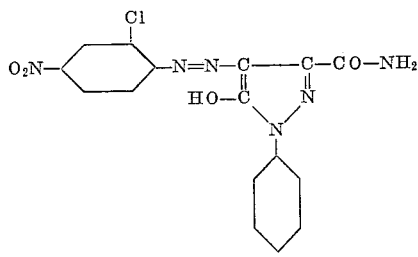

5. Dyestuff of the formula

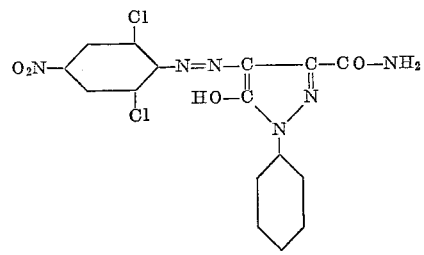

6. Dyestuff of the formula

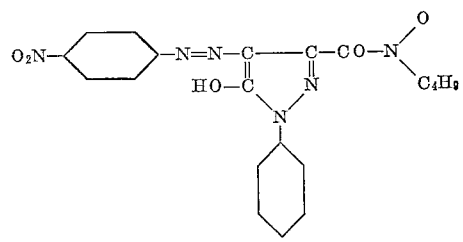

References Cited in the file of this patent
UNITED STATES PATENTS

| | | |
|---|---|---|
| 2,228,303 | Fischer | Jan. 14, 1941 |
| 2,430,484 | Strain et al. | Nov. 11, 1947 |
| 2,439,798 | Dickey et al. | Apr. 20, 1948 |
| 2,898,178 | Kruckenberg | Aug. 4, 1959 |
| 2,906,747 | Wolfrum | Sept. 29, 1959 |
| 2,955,901 | Kruckenberg | Oct. 11, 1960 |
| 3,019,217 | Joyce | Jan. 30, 1962 |

UNITED STATES PATENT OFFICE
CERTIFICATE OF CORRECTION

Patent No. 3,130,190                                April 21, 1964

Ernest Merian et al.

It is hereby certified that error appears in the above numbered patent requiring correction and that the said Letters Patent should read as corrected below.

Column 1, line 72, for "of", second occurrence, read -- or --; column 2, line 2, for "of", first occurrence, read -- or --; column 6, lines 39 to 47, for the right-hand portion of the formula reading

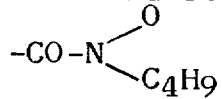      read      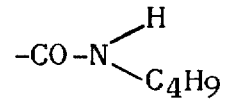

Signed and sealed this 24th day of November 1964.

SEAL)
Attest:

ERNEST W. SWIDER                              EDWARD J. BRENNER
Attesting Officer                                 Commissioner of Patents